OLEFIN POLYMERIZATION CATALYST CONTAINING AN ORGANOMAGNESIUM COMPLEX AND PROCESS FOR SYNTHESIS
Filed Dec. 23, 1963
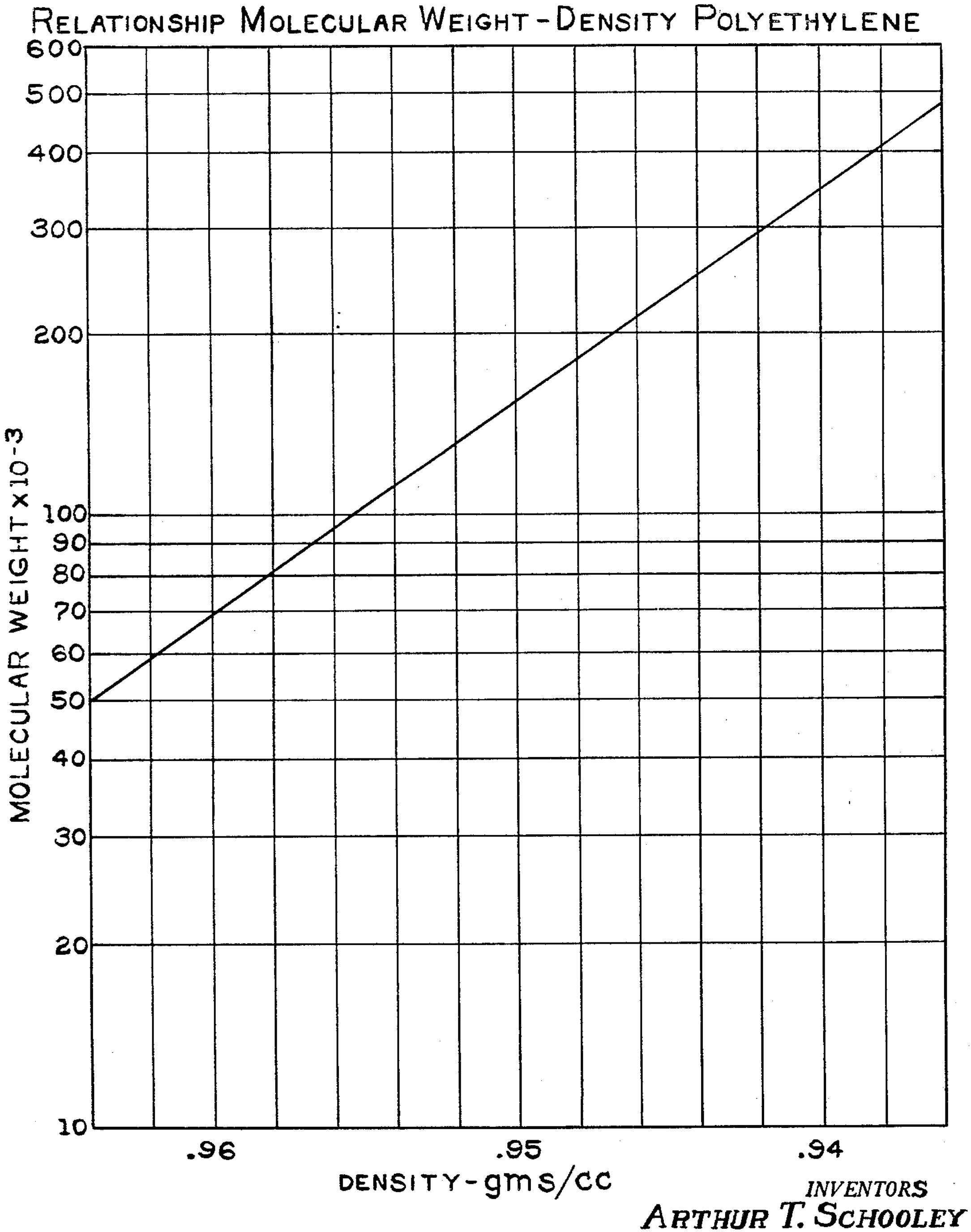
INVENTORS
ARTHUR T. SCHOOLEY
OTTO REIDL
BY Louis J. Weisz
ATTY.

United States Patent Office 3,392,159
Patented July 9, 1968

3,392,159

OLEFIN POLYMERIZATION CATALYST CONTAINING AN ORGANOMAGNESIUM COMPLEX AND PROCESS FOR SYNTHESIS

Arthur T. Schooley, Akron, and Otto Reidl, Cleveland, Ohio, assignors to Goodrich-Gulf Chemicals, Inc., Cleveland, Ohio, a corporation of Delaware Filed Dec. 23, 1963, Ser. No. 332,430
19 Claims. (Cl. 260—93.7)

This invention relates to the polymerization of olefins; more particularly, however, this invention relates to the polymerization of olefins to produce relatively high density polymers by means of novel catalysts having unusually high efficiencies, storage capabilities and productive life.

Since the advent of Ziegler organometallic-heavy metal catalysts, such systems have been widely employed in industry to accomplish the polymerization of olefinic monomers at pressures and temperatures never before practical. The polymers so produced have been ideally suited to many applications including, particularly, the fabrication of containers, tubes, toys and other shapes requiring a high degree of rigidity.

Many of the Ziegler catalyst systems now in use in olefin polymerization processes, such as in the manufacture of polyethylene, produce polymers having densities up to about 0.94. While such products can be employed in some applications requiring high density characteristics, the development and use of polymers having even higher densities, for example, 0.96 and above, permits greater structural strength to be achieved with comparable designs. In many instances, high strengths can be taken advantage of by way of redesign, to achieve economies in the quantity of material employed in fabrication of particular articles without sacrifice of strength.

Although the use of Ziegler catalysts to polymerize olefins results in simplification of processing equipment, yet such catalysts are not inexpensive. Large quantities of the catalysts are inevitably destroyed in their employment, and this loss is an important factor in establishing production costs. It is economically desirable, therefore, to achieve as high an efficiency, that is as large a yield of polymer per unit of catalyst expended, as is possible.

Now a highly efficient catalyst has been developed which permits relatively large quantities of polymer to be prepared per unit of catalyst employed. Through the use of the new catalyst, polyolefins can be prepared having density values which assure their usefulness in applications in which high strength is a necessity. In addition to assuring high efficiency, in its preferred embodiment, the invention provides a catalyst which has a greatly extended useful polymerization life. Also of advantage is the fact that the discovered catalysts are in many instances particularly easy to remove from the polymeric product, thus assuring a high quality polymer. A further benefit provided by the catalyst of the invention is its long storage life, a characteristic which permits considerable flexibility with respect to its manufacture.

In accordance with this invention, a process has been found for polymerizing olefins which comprises contacting an olefin with a polymerization catalyst produced by heating an organohalide with magnesium to form an organo-magnesium complex, and thereafter combining the complex formed with a heavy metal compound to produce the catalyst. In a preferred embodiment, the catalyst formed is subsequently combined with an organo-aluminum compound to produce a particularly long-lived, efficient catalyst.

The catalyst of the invention is obtained by initially reacting magnesium, preferably in the form of a finely divided metal, with any of various organohalide compounds to form one of the necessary catalyst components. Conveniently, an excess of the organohalide compound is employed to produce a mixture containing both a solid and a substantial liquid phase. The mixture is thereafter combined with any of certain heavy metal compounds, normally dissolved in an organic solvent, to yield an active catalyst. If the catalyst thus prepared is not to be employed relatively soon after its preparation, it has been found of advantage to replace its liquid constituent with a liquid medium having little or no solubility for the solid portion of the catalyst. In any event, such a replacement increases the polymerization life of the catalyst and is desirable for that reason also. Since aging of the catalyst prior to use has been found to provide improved efficiencies, such a procedure is desirable in most instances. In a preferred embodiment of the invention, the catalyst is combined with an organoaluminum compound to produce a catalyst system displaying particularly high efficiencies, even in the absence of aging, which is characterized by long polymerization and storage life. Catalyst resulting from this latter embodiment has also been discovered to yield polymeric product which can be processed to yield unusually low ash contents.

Following its preparation, the catalyst, conveniently combined with additional solvent, is contacted with the olefin to be polymerized. Commonly, the polymerization system is adjusted by the addition of a modifier to produce polymer having a preferred molecular weight. Inasmuch as molecular weight is determinative of the density characteristic of the polymer, control in this fashion enables the high density materials, particularly preferred in the invention, to be readily obtained.

The catalyst system disclosed herein is capable of effecting the polymerization of many different olefins for example, ethylene, propylene, butylene and others, or mixtures of them. The catalyst is particularly valuable, however, in the polymerization of ethylene, and when used for such purpose, particularly high yields of polymer per unit of catalyst expended are possible. Suitably modified the polymerization system contemplated produces ethylene in a wide range of molecular weights, and highly crystalline polyethylene having a density in excess of 0.96 is readily achieved.

Actual preparation of the catalyst is carried out in a series of sequential steps, ultimately resulting in the particular embodiment of the catalyst system desired. The first of these encompasses reaction of an organohalide compound with magnesium to produce what is termed herein an "organo-magnesium complex," sometimes referred to hereafter simply as the "complex." The particular form of the magnesium component of the reaction is relatively unimportant. Generally, however, it will be found that finely divided magnesium, preferably free from contaminating surface films, will give the more rapid, complete reactions, as well as a minimum of undesirable contaminants.

The organohalide component may be any of fluorine, chlorine, bromine, or iodine, while the organic portion of the compound, generally speaking, may be chosen from alkyl, aryl, arylalkyl or other radicals, and may consist of benzene, naphthalene or toluene derivatives, as well as methyl, ethyl, propyl, butyl isobutyl, hexyl, isooctyl and additional radicals. The use of aromatic halides is of considerable advantage, the phenyl group being particularly preferred. In its most effective embodiment, the employment of an excess of a phenylhalide, such as chlorobenzene, in combination with finely divided magnesium is contemplated.

The reaction temperature may be varied over a considerable range without affecting the results produced. Conveniently, the reaction is run at the reflux temperature of the organohalide constituent, although lower temperatures may be used if additional time is allowed for completion of the reaction. Higher temperatures, of course, may also be employed if the reaction is carried out under pressure, the chief disadvantage being that in some instances, the formation of by-products is increased at higher temperatures. In the case of the use of chlorobenzene, a temperature approximating 130° C. has been found to be ideally suited to the purpose, although under proper circumstances, the temperature can be increased to 160° C. and higher without disadvantage. At the 130° C. temperature, a satisfactory reaction is easily accomplished in from about 18 to 24 hours.

Particularly where an excess of the organohalide has been used, the product contains a substantial liquid phase in addition to the solids present. The solid phase includes magnesium halide, an organo-magnesium containing constituent, and commonly, some magnesium oxide, while the liquid phase comprises any excess organohalide, as well as organo-magnesium constituent. While the invention is not conditioned on the identification of its exact nature, the organo-magnesium constituent is believed to consist at least in part of an organo-magnesium complex, which may include both organo-magnesium and magnesium halide constituents in a ratio of seven of the former to one of the latter. As used herein, however, "organo-magnesium complex," "complex" and similar terminology is to be construed as referring to the organo-magnesium constituent in whatever form present.

Although the liquid phase may, by itself, be employed in the preparation of a polymerization catalyst, it has been determined that the use of both the liquid and solid phases is especially desirable if the polyolefins, particularly polyethylenes, are to have the high bulk densities which can be realized by the use of the present invention. Among other reasons, polymer having a high bulk density is of advantage because it makes possible increased extruder throughput in convertor operations, resulting in desirable economies. In addition, catalyst efficiencies, normally expressed as grams of polymer produced per gram of catalyst expended, may also be considerably improved through use of the unabridged mixtures.

Adjustment of the relative amounts of magnesium to organohalide employed in the reaction, especially where the latter compound is chlorobenzene, so that the organo-magnesium produced will be present in a concentration at least 0.05 molar is preferred. A molar concentration of at least 0.25, however, is particularly advantageous although higher concentrations, up to 1.5 and higher, may be prepared if desired. Following preparation of the complex containing mixture described, the mixture is combined with a heavy metal compound, the latter material preferably being dissolved in a solvent, to accomplish formation of an active catalyst system.

While it is possible to obtain a polymerization following any order of combination of the heavy metal compound with the complex, surprisingly, it has been determined that the order of addition has an important effect on the efficiency of the catalyst produced. Without attempting to explain the phenomenon, it has nevertheless been observed that increases in efficiencies of up to about 1300% can be realized when the complex is added to the heavy metal compound, over efficiencies obtained when the reverse order is employed. Addition of the complex to the heavy metal compound is, therefore, greatly preferred.

Many different metal compounds of the group commonly referred to as heavy metals may be used for the purpose. The metal may be chosen, for example, from any of various metals including cobalt, titanium, vanadium, zirconium, or the like. The use of titanium, however, results in a superior catalyst and is, accordingly, much preferred. The trihalides, tetrahalides, alcoholates and similar compounds of the foregoing metals may all be used including specifically, compounds such as titanium chloride, tetrabutyl titanate, titanium bromide, titanium iodide, tetraisopropyl titanate, titanium fluoride, vanadium halides including the chloride, iodide, fluoride and bromide, cobalt and zirconium compounds corresponding to the preceding, and many other compounds.

Any organic solvent can be employed for dissolving the heavy metal compound including aromatics, aliphatics and others; thus, material such as hexane, heptane, isooctane, hydrocarbons such as Humble Oil's "Isopar" D and E solvents, i.e., highly branched C8, 9 and 10 hydrocarbons, can be used as can benzene, toluene, chlorobenzene and the like. Catalyst reactants, however, such as, alcohols, acetones, ketones and the like are obviously to be avoided. Particularly, all steps employed in synthesizing the organo-magnesium constituent of the catalyst according to the invention should avoid the presence of ether compounds since their presence contaminates the catalyst and results in products which have low, and therefore undesirable crystallinities.

The ratio of reactants is not particularly critical, and a practitioner may employ considerable latitude in determining their relative presence. Expressed as the molecular ratio of complex, as measured by the organo-magnesium constituent present, to heavy metal compound, it has been found that a ratio of as low as 0.77 will produce a satisfactory catalyst. The ratio may, of course, be much higher, the maximum being dictated more by economic rather than technical considerations. Based on a consideration of all factors, a ratio in the neighborhood of at least about 1.4 is preferred.

The conditions under which the reaction is carried out are also susceptible to considerable variation. Thus, in the case of temperature, although the higher temperatures have a somewhat adverse effect on catalyst storage life, temperatures up to 50° C. and considerably above are satisfactory. The use of room temperature, i.e., approximately 24° C., is convenient for obvious reasons, but the reaction can be carried on well below such point.

As with the temperature, the pressure may be widely varied, and while provision for autogenous pressure provides advantages, any pressure from sub-atmospheric through super-atmospheric may be also used. The reaction commences almost immediately on combination of the reactants and is substantially complete in a very short time. A half hour assures completeness of reaction and substantial equilibrium of the system although less time may be allowed if preferred.

The product of the latter reaction is a reaction mixture consisting of a finely divided, usually blackish precipitate interspersed in a liquid phase. Although not intending to be bound by the theory, it is postulated that the precipitate consists of some combination of the heavy metal compound with the complex formed in the initial reaction. Particularly in instances where an excess of chlorobenzene has been reacted with magnesium, although the catalyst produced upon combination with the heavy metal compound has a fair degree of efficiency, up to 400 grams of polymer per gram of catalyst expended has been realized, the efficiency drops off rapidly in storage, in some cases to efficiencies well below 100 in as little as about 64 hours.

While the decrease in efficiency is not fully understood, it has nevertheless been discovered that if the liquid phase of such a catalyst reaction mixture is replaced with a liquid medium having little or no solvent capabilities with respect to the solid phase, a decrease in efficiency is not experienced, and indeed, the catalyst maintains its normal efficiency in storage up to 600 hours and even longer.

In addition to increasing the period during which the catalyst can be stored prior to use without detrimentally affecting its efficiency, the actual useful life of the catalyst in olefin polymerization reactions is considerably increased. Thus, while with a catalyst which has not undergone replacement of the liquid phase of its reaction mixture, a polymerization life of no more than perhaps 2 to 4 hours can be expected, in those instances where there has been a replacement of the liquid phase with a liquid medium having a low order of solubility for the solid phase, a useful polymerization life of from 6 to 8 hours, for example, is readily obtained.

While the advantage of increased polymerization life will be readily appreciated, the freedom to store catalyst for relatively long periods without adversely influencing catalyst efficiency is also of considerable advantage since it permits a high degree of flexibility in scheduling catalyst manufacture. Furthermore, it makes the manufacturer of catalyst at one location for use at another location entirely feasible.

Actual replacement of the liquid phase of the catalyst can easily be accomplished by filtration or centrifuging. Since the catalyst precipitate ordinarily settles rapidly following discontinuance of agitation, decantation also provides a simple way in which the desired separation can be effected.

Following removal of the original liquid phase, the liquid medium having little or no solubility is introduced to the catalyst precipitate. While a greater or lesser amount of liquid may be added than was originally present, a quantity of liquid medium approximately equivalent to that discarded will ordinarily be employed.

An idea of the relative solubility of the complex in a particular liquid medium may be obtained by introducing a small portion of the liquid phase of the complex containing slurry into a relatively large quantity of the liquid medium and observing whether, and the extent to which precipitation is induced.

The replacement liquid medium chosen may be any organic solvent displaying little or no solubility for the catalyst precipitate. Thus, one may employ generally an aliphatic compound such as, for example, hexane, heptane, isooctane and the like, the "Isopar" mixtures, and any other organic liquids meeting the solubility requirements, substantially unreactive with the catalyst, or mixtures of them.

The catalyst may be used immediately following its preparation to effect an olefin polymerization. Preferably, however, the catalyst is permitted to age for a period prior to use. That the aging step is of considerable advantage may be judged from the fact that immediately following its formation and liquid replacement, the catalyst will commonly be characterized by an efficiency somewhat below 200 grams per gram. Following an aging period of approximately 50 hours, the efficiency will frequently have risen to 600, and efficiencies of 1,000 and above have been achieved after at least about 100 hours of aging. The aging necessary to fully "ripen" the catalyst may be conveniently carried out at room temperature, in the substantial absence of air and moisture.

The substantial exclusion of moisture and air should of course be provided for in the case of all steps involved in the preparation and use of the catalyst since both the catalyst and its components are detrimentally reactive with such substances. In many instances it will be found to be of advantage to employ the use of an inert gas such as for example, dry nitrogen, methane, helium, argon or the like to reduce the possibility of any such contamination.

While the catalyst described is capable of producing highly efficient polymerizations, it is frequently of advantage to combine the catalyst with an organoaluminum compound. Addition of such a compound provides several advantages, one result being the obviation of any necessity for aging the catalyst. Catalyst efficiencies of 1,000 and higher have, for instance, been realized immediately after addition of the aluminum compound, following liquid phase replacement as aforementioned. Nor has any disadvantage been encountered either in the storage periods permissible with such a catalyst, or with respect to the useful polymerization life of the catalyst, such characteristics being substantially the same both in the case of the catalyst embodiment employing an organoaluminum compound as well as in that which does not.

A further advantage arises from the fact that it has been found to be easier to remove polymerization catalyst residues from polymers in the presence of an organoaluminum compound whether the aluminum compound is added prior to, during, or subsequent to the polymerization. Any aluminum compound containing at least one organic radical connected to the metal atom through an aluminum to carbon bond is satisfactory for the purposes of the invention. Thus, one may use diisobutylaluminum hydride particularly preferred, triisobutylaluminum, a diethylaluminum halide, an isobutylaluminum dihalide and any number of other, similar compounds.

The ratio of catalyst to organoaluminum compound can be widely altered without adverse effect to catalytic qualities. Expressed as a ratio of the oragnoaluminum compound to the heavy metal compound employed in catalyst manufacture, it will be found that better results are realized if the ratio is maintained at a value of at least about 1.5, but that the best results are to be obtained where the ratio is at least as high as about 2.0. Although the higher side of the ratio might be said to be about 50.0, the limitation is primarily one of the economics, and higher ratios can be used. After the addition of the organoaluminum compound, such embodiment of the catalyst is immediately ready for use in the polymerization of the desired olefin without further treatment.

Following its synthesis in the embodiment desired, the catalyst is in condition for promoting the polymerization of a selected olefin or mixture of olefins. The polymerization can be effected by combining the catalyst, if preferred in a reaction solvent, with the monomer chosen, optionally, in the presence of a modifier.

Any of various solvents substantially unreactive with the catalyst system may be used, irrespective of the degree of solvency exhibited towards the solid phase of the catalyst. Thus, may be chosen organic liquids such as aromatics, aliphatics, chemical combinations of them, and their mixtures, including benzene, xylene, butane, hexane, the Isopar solvents and a wide variety of various other materials. Experience has shown, however, that selection of a polymerization solvent having little or no solubility for the solid components of the catalyst produces a flat reaction rate rather than a rapid, quick-drying polymerization. It is for this reason that employment of a nonsolvent for the catalyst solids for example, the more aliphatic substances, is preferred.

The polymerization may be run either on a batch or continuous basis, as desired. The pressure may be varied within broad limits, and pressures at, in excess of, or lower than atmospheric all can be used. Since the molecular weight is affected somewhat by the pressure conditions of the reaction, it is preferable to maintain the pressure substantially constant throughout the polymerization.

The polymerization reaction can be run at a temperature from about 0° to about 100° C. without difficulty; however, as higher temperatures are employed, the product becomes more fibrous and tacky. A particularly preferred range at which to control the temperature is in the area of 70–80° C. Since the temperature affects molecular weight of the product produced, controle of this variable may be used, if desired, to obtain the molecular weight required.

Still other methods are available for molecular weight control including hydrogen addition, described in U.S. Patent No. 3,051,690; addition of boron trifluoride, shown in U.S. Patent No. 2,922,782, and other means not limited to, but including addition to the reaction mixture of controlled amounts of diethylzinc and various titanium compounds. It will be appreciated that the amount of modifier required to obtain a desired molecular weight is dependent upon the particular system and reaction conditions chosen as well as on the modifier selected. It has been found, for example, that the presence of organoaluminum compounds in the catalyst in many cases substantially reduces the quantity of modifier required to achieve a particular molecular weight.

The quantity of catalyst employed in producing the polymerization will depend somewhat on the conditions of reaction chosen including such considerations as the nature of the solvent, the rate of reaction desired, the molecular weight sought and similar factors. Generally, however, a sufficient amount of catalyst will be employed so that the complex, as measured by the organo-magnesium constitutent present, and heavy metal compound will together amount to at least about 0.1 to 0.2 gram per liter of polymerization reaction mixture used.

The time required for completion of the reaction depends on the molecular weight which it is desired to achieve and on the heat transfer capabilities of the reaction system; in other words, when the solution becomes too thick for the heat transfer necessary to maintain the necessary temperature control, the reaction will usually be discontinued. Ordinarily, the reaction, which starts immediately upon contact of olefin monomer with the catalyst, will be permitted to continue for approximately 6 hours before being terminated. Termination is readily accomplished among other ways by addition of any of various deactivation agents including compounds such as, methanol, other alcohols, acetone, water, and the like; following which, the polymer can be separated as a crude product.

To produce the more commercial products, the resulting polymer is normally purified, that is, catalyst residues are removed by treatment with caustic solutions, dilute acids, water, alcohol, or combinations of these, and dried, conveniently in a vacuum at temperatures ranging up to the softening point of the polymer.

As previously stated, the density of the polymer produced depends upon its molecular weight, the latter, in turn, being a function of the reaction conditions employed including temperature, pressure, the type of modifier used, if any, and similar factors. It is commonly known that in olefin polymerization systems, a particular catalyst is frequently characterized by a particular molecular weight-density relationship. The catalyst system of the present invention likewise has a distinctive relationship which is illustrated by FIGURE 1, wherein molecular weight of the polymer is plotted against density. The plotted relationship, although for a hydrogen modified, diphenyl magnesium complex-titanium tetrachloride catalyzed polymerization, is substantially characteristic of the catalyst of the invention, either with or without added organo-aluminum compounds, where the polymerization reaction is either unmodified, or if modified, is modified without alteration of the catalyst as, for instance, where modification is achieved with hydrogen or simple hydrogen donors. Where, however, the polymerization system is modified with materials such as diethyl zinc or titanium compounds, substances which contain metals exerting a catalytic influence, the relationship of molecular weight to density is in some cases shifted somewhat. Even where modification of the latter type is employed, however, any such deviation can easily be determined and desired allowances made therefor so that the product required may be obtained.

The following examples while illustrative of the invention are not intended to be construed as limiting the same to the embodiments disclosed.

EXAMPLE I

In this example, the organo-magnesium complex component of the catalyst is prepared as follows. A 5-gallon, enclosed, jacketed vessel equipped with agitation means is thoroughly purged with dry nitrogen until the substantial removal of moisture and oxygen present is accomplished. Approximately 12 kilograms (10.9 liters, 2.89 gallons) of chlorobenzene, previously dried by contact with molecular sieves, and 130 grams of Grignard grade magnesium turnings are added. The mixture is heated to about 141° C. by steam introduced to the reactor jacket and simultaneously agitated during the reaction which is continued for a period of 24 hours. At the end of such time the steam is replaced by cooling water and the reactor's contents cooled to about room temperature before being discharged into a nitrogen-blanketed storage container. The complex containing product, observed to consist of a yellow-green slurry which analysis indicates to have 0.254 molar concentration of diphenyl magnesium, is subsequently used to make up a polymerization catalyst as follows.

A three-liter, enclosed kettle is thoroughly cleaned, dried and purged with nitrogen, before being charged with 2.71 liters of Isopar D previously dried with molecular sieves. Approximately 6.6 milliliters of titanium tetrachloride are next added, followed by 285 milliliters of the complex containing slurry prepared as above described. The mixture is agitated at room temperature, 24° C., for about 30 minutes after which agitation is discontinued and the black precipitate formed during the reaction permitted to settle. The clear supernatant liquid is then carefully siphoned from the catalyst mixture and replaced with an equal volume of dry, fresh Isopar D. The mixture is agitated once more until thorough washing of the solids has been obtained; the solids are allowed to settle, and the supernatant liquid decanted and replaced with fresh Isopar D. Following its preparation, the catalyst is aged for a period of about 2.7 hours at which time it is employed in an ethylene polymerization.

In carrying out the polymerization reaction, an enclosed, two-liter stirred, glass reactor vessel is carefully cleaned, dried and purged with nitrogen. One liter of dry Isopar D is charged to the vessel, and ethylene which has been passed over molecular sieves before entering the reactor is passed through a dip tube discharging beneath the surface of the liquid in the vessel, prior to being vented. The temperature of the contents of the reactor are adjusted to approximately 70° C. by infra-red lamps positioned immediately adjacent to, and directed on the reactor. Approximately 25 milliliters of the catalyst mixture, containing a combined weight of diphenyl magnesium and titanium tetrachloride of about 0.20 gram, is introduced into the reactor to initiate the reaction.

The polymerization is continued at about 70° C. and a pressure of 737 mm. Hg, absolute, for 2 hours and 15 minutes at which time the amount of ethylene gas leaving the reactor vent is approximately equal to that entering, as measured by gas meters, indicating that the catalyst is substantially exhausted. At this point, a total of 12.8 grams of ethylene are determined to have been absorbed by the polymerization mixture.

The contents of the vessel are discharged into a beaker containing 2 liters of anhydrous methanol, and the mixture is agitated for several minutes before being filtered on a Büchner filter. The polymer is then reslurried in an additional 4 liters of methanol, previously saturated with anhydrous HCl, and again agitated, this time for a period of one hour. Following the latter treatment, the polymer is refiltered on the Büchner, washed on the filter with about 1 liter of methanol, and vacuum dried for 8 hours.

The procedure results in a yield of approximately 4 grams of polymer. The catalyst efficiency obtained during the polymerization is calculated to have been about 20 grams of polymer per gram of catalyst expended.

While as previously stated it is believed that at least some of the organo-magnesium constituent of the catalyst may be present in the form of a complex with magnesium halide, the invention is not conditioned on any such theory and indeed, where relative or quantitive reference is made with respect to the supposed complex, such ratio or quantity is, in fact, based on the organo-magnesium constituent present, including both its soluble and insoluble forms.

Although other methods of analysis are available, a procedure which may be employed, and which is used herein, includes reaction of the organo-magnesium containing constituent, in the case of this Example I, the diphenyl magnesium constituent, with water to form a hydroxymagnesium compound. The basic magnesium compound may then be reacted with an excess of acid following which the excess may be back-titrated with a base. In practice, a measured amount of the homogeneous slurry resulting from reaction of the magnesium metal with the organic halide is combined with an excess of water, an indicator is introduced, and a reagent such as sulfuric acid of known normality is added until a color change is obtained. Following addition of a quantity of excess acid, the mixture is back-titrated with a base, for example sodium hydroxide, of known concentration until a further color change is noted. From the amounts of reagents employed, the quantity of the organo-magnesium present is readily calculated.

EXAMPLE II

In a series of further experiments, portions of the catalyst prepared in Example I are permitted to age for varying periods before being employed in additional polymerizations substantially identical to that described in the first example.

In one such experiment, 25 milliliters of the catalyst, (0.20 gram of diphenyl magnesium plus titanium tetrachloride) aged for 45½ hours, are added to the reactor prepared and operated in the manner of Example I. The reaction thus initiated is found to remain active for a period of about six hours and 45 minutes during which time a total of 114.8 grams of ethylene are absorbed by the reaction mixture. Following work-up and drying, 94 grams of polymer are obtained, an amount equivalent to a calculated efficiency of 470 grams/gram.

The following table tabulates three additional runs conducted in the manner of Example I, but which employ catalysts aged for longer periods.

| | Catalyst Charged (Grams Diphenyl Magnesium+Titanium Tetrachloride) | Polymer Produced, Grams | Catalyst Efficiency, Grams Polymer Produced/Grams Catalyst Expended |
|---|---|---|---|
| Catalyst Aging Period, Hrs.: | | | |
| 69.5 | 0.20 | 185 | 925 |
| 159 | 0.20 | 298 | 1,490 |
| 334 | 0.20 | 245 | 1,250 |

From the above experiments, carried out for the purpose of examining the parameters of the aging variable, it is apparent that increasing the aging period produces a beneficial result on catalyst efficiency. Beyond a certain point, however, it appears that no further advantages are to be obtained from lengthening the aging period.

EXAMPLE III

An additional example designed to explore the effects of failure to replace the liquid phase of the catalyst mixture with a liquid medium having little or no solubility for the solid phase is carried out as follows.

The organo-magnesium complex required for the catalyst is prepared in substantially the same manner as described in the previous examples. The catalyst itself is prepared in a catalyst reservoir container which has been carefully cleaned, dried and purged with nitrogen. To the reservoir are added 90 milliliters of molecular sieve-dried, hydrogenated propylene trimer, followed by 0.22 milliliter, 2 gram millimoles, of titanium tetrachloride and 9.5 milliters of the complex containing slurry, having a diphenyl magnesium content of 2 gram millimoles. Upon addition of the "complex-slurry" to the titanium halide, the catalyst forming reaction begins almost immediately, resulting in formation of the characteristic black precipitate and clear supernatant phase. Following its production, the catalyst mixture, which contains an appreciable amount of catalyst solubilizing chlorobenzene from synthesis of the complex-slurry, is permitted to remain in the reservoir at room temperature, 25° C., for an aging period of approximately 64 hours.

The polymerization reaction is conducted in a 4 liter enclosed, glass polymerization vessel, equipped with mechanical agitation means and infra-red heating lamps, which has been thoroughly cleaned and purged with nitrogen prior to use. In carrying out the polymerization, 1 liter of dried hydrogenated propylene trimer is added to the reactor, and a stream of dry ethylene is passed through the vessel as in the first example.

To initiate the reaction, 0.737 gram of the catalyst mixture, i.e., diphenyl magnesium plus titanium tetrachloride, is charged to the reactor, the contents of which have been adjusted to 70° C. by means of the infra-red lamps. The reaction is carried on at an absolute pressure of 734 mm. Hg for a period of two hours before the activity of the catalyst drops to a point which indicates substantial exhaustion. Approximately 73.5 grams of ethylene are found to have been absorbed by the reaction mixture during the reaction period.

The polymeric product is worked up and dried as in the previous examples to yield 60 grams, equivalent to a calculated efficiency of only 81 grams/gram.

It is observed that in Example II, an experiment employing a substantially identical catalyst, aged for 69.5 hours, which, however, has undergone replacement of its catalyst solubilizing liquid phase with a liquid medium having little solubility for the solid phase of the catalyst, an efficiency of 925 grams/gram is obtained. From the comparison, it appears clear that the technique of liquid replacement has a marked beneficial effect on catalyst efficiency.

EXAMPLE IV

Another experiment is carried out which indicates the importance of the order of addition, each to the other, of the organo-magnesium complex containing slurry and the heavy metal compound components of the catalyst. In the experiment, the diphenyl magnesium complex containing slurry is prepared as in the first example, following which 9.5 milliliters of the slurry are added to a clean, dry, nitrogen-purged catalyst reservoir to which has been added 90 milliliters of molecular sieve-dried Isopar D. Approximately 0.22 milliliter of titanium tetrachloride is then added to the reservoir to produce the catalyst-forming reaction. The reaction itself is carried out at room temperature, 24° C., to produce a black precipitate which, however, in contradistinction to the usual case wherein a clear liquid is formed, is present in a brown supernatant liquid. Following a reaction time of about ½ hour, the reservoir's agitator is turned off and the solid portion of the slurry is permitted to settle. The supernatant liquid is carefully siphoned off and replaced with an equivalent volume of fresh, dry Isopar D. The catalyst mixture is again agitated and permitted to age for a period of 72 hours before being employed in the polymerization reaction.

It will be observed that the above procedure describes the addition of the heavy metal compound to the complex component which is, of course, the reverse of the order of addition normally employed and recommended for carrying out the process of the invention.

The actual polymerization is conducted in an enclosed, glass, 4-liter, stirred polymerization vessel, previously cleaned, dried and purged with nitrogen. In conducting the reaction, the polymerization vessel is charged with 2 liters of dry Isopar, and the system is saturated with ethylene in the manner described in connection with the preceding example. The polymerization is begun by charging to the reactor 0.402 gram of the catalyst, based on the total of the diphenyl magnesium and titanium tetrachloride present in the slurry added, and is continued for about 2 hours at a reaction temperature of 70° C. and an absolute pressure of 739 millimeters of mercury before the catalytic activity drops to an impractical rate. At this point, it is seen that a total of 15.1 grams of ethylene has been absorbed by the reaction mixture.

Work-up of the polymer is performed in the manner of Example I to yield 9 grams of polymer, constituting a calculated efficiency of only 22.4 grams per gram.

Again, referring to the experiment described in Example II which employs a catalyst substantially the same as that employed in this example, which has been aged for 69.5 hours, notwithstanding the fact that the polymerization detailed in that experiment is conducted in the same manner as this example, the efficiency in the former experiment is 925 grams/gram as compared to the 22.4 grams/gram obtained in this experiment. It is apparent that the order of addition employed in Example II is greatly to be preferred in carrying out the invention as compared to the order of addition employed in the instant example.

EXAMPLE V

In an additional experiment, a diphenyl-magnesium complex containing slurry is made as described in Example I. The slurry is subsequently employed in manufacturing a polymerization catalyst by the addition of 30 milliliters of the slurry to a catalyst reservoir previously cleaned, dried and flushed with nitrogen to which 70 milliliters of sieve-dried Isopar D, and 1.8 grams of zirconium tetrachloride have been added. The reaction, which commences almost immediately, produces a typical precipitate in combination with a clear supernatant phase. The clear supernatant liquid is subsequently decanted and replaced with an equivalent volume of fresh, dry Isopar in the usual fashion.

The ethylene polymerization is carried out in a two-liter polymerizer of the type described in Example I. One liter of dry Isopar is added to the reactor and saturated with ethylene, as described in the first example, before the catalyst mixture is added to the reactor vessel to initiate the reaction.

After approximately 2½ hours of reaction, which is carried on at a temperature of 70° C. and an absolute pressure of 732 mm. Hg, the catalyst has been substantially exhausted, and the reaction mixture is worked up as previously described. During the polymerization, the reaction mixture is determined to have absorbed a total of 16.3 grams of ethylene, from which 2.5 grams of product are obtained following drying of the polymer. The results obtained clearly demonstrate that a zirconium heavy metal catalyst component can successfully be employed to produce the desirable polymeric products obtainable through use of the invention.

EXAMPLE VI

In an additional experiment, a quantity of diphenyl-magnesium complex containing slurry, prepared in the manner employed in Example I, is added to an enclosed catalyst reservoir, maintained under a nitrogen atmosphere, which contains 54 milliliters of dry Isopar D and 1.8 grams of vanadium trichloride. Approximately 46 milliliters of the complex containing slurry are thus added to produce the typical precipitate forming catalyst reaction. Following the reaction, the supernatant phase of the catalyst is replaced with fresh Isopar D as previously described.

The catalyst mixture is employed in the polymerization of ethylene as follows. A two-liter reactor of the type described in Example I is cleaned, dried and purged with nitrogen, following which 1 liter of sieve-dried Isopar D is added. The liquid is heated to 70° C. by means of the infra-red lamps, and ethylene is purged through the reactor, also in the manner of Example I. The catalyst mixture is subsequently added to the polymerizer to initiate the reaction which is carried on at 24° C., room temperature, and at a pressure of 733 mm. Hg, absolute. The polymerization is continued for a period of approximately 2 hours during which a total of 8.9 grams of ethylene are absorbed by the reaction mixture, producing 2.5 grams of the desired polymer following work-up and drying as in the previous examples.

EXAMPLE VII

In a further experiment, the catalyst system of the invention is combined with an organoaluminum compound to provide a system possessing additional advantages.

The diphenyl-magnesium complex containing slurry is produced as described in detail in Example I. An enclosed catalyst reservoir is cleaned, dried and flushed with nitrogen in the ordinary fashion following which it is charged with approximately 90 milliliters of molecular sieve-dried Isopar and 0.22 milliliter (0.38 gram) of titanium tetrachloride. The reaction initiated is permitted to continue at room temperature, 24° C., for about 1 hour before the supernatant liquid is separated from the resulting precipitate by decantation. The liquid phase is replaced with additional dry Isopar agitated to thoroughly wash the precipitate, and the wash solution decanted. Following the addition of an equivalent amount of fresh Isopar, approximately 1.3 milliliters (1.20 grams) of diethylaluminum chloride are introduced to the catalyst reservoir to produce the improved catalyst.

The ethylene polymerization is carried out in a two-liter reactor, maintained in a clean, dry condition and under the nitrogen, to which one liter of Isopar E has been added. The reactor is saturated with ethylene, and about 1.06 grams of catalyst, based on the quantity of diphenyl-magnesium, titanium tetrachloride and diethylaluminum chloride present, is added to catalyze the polymerization.

The polymerization reaction is carried on at a temperature of 24° C. and an absolute pressure of approximately 742 millimeters Hg for 1½ hours. At the latter point, while it is apparent that the catalyst is not exhausted, the reaction mixture has become so thick with the polymer formed that heat transfer problems dictate discontinuance of the run. Inspection shows approximately 321.4 grams of ethylene to have been absorbed by the mixture during the reaction.

The reaction mixture is subsequently deactivated and worked up in the manner of the first example to produce 326 grams of polymer, from which the efficiency of the reaction is calculated to have been 307 grams/gram.

The significance of the experiment derives in part from the fact that the catalyst employed, although unaged, has produced an efficiency approaching that realized in one of the runs detailed in Example II in which, however, the catalyst is aged for 45½ hours. The ability to employ the catalyst immediately following its preparation is, of course, of considerable advantage in many instances.

EXAMPLE VIII

In this example, a diphenyl-magnesium complex containing slurry is produced as in Example I and subsequently added to a catalyst reservoir previously cleaned, dried, and maintained under a nitrogen atmosphere, which contains approximately 90 milliliters of sieve-dried Isopar D to which 0.22 milliliter (0.38 gram) of titanium tetrachloride has been added.

The reaction is continued at 24° C. for approximately one hour before the supernatant liquid is decanted, the precipitate washed, and fresh, dry make-up Isopar D added as in the previous example. Following the wash procedure, 2.5 milliliters (1.98 grams) of triisobutylaluminum is added to the catalyst reservoir, and the resulting mixture is immediately employed in the polymerization of ethylene in the following manner.

The reactor vessel equipment and procedure used are similar to that of the preceding Example VII, except that in this case, 1.31 grams of catalyst, on the basis of the total diphenyl-magnesium, titanium tetrachloride and triisobutylaluminum present, are employed, and except that the reaction is continued for an hour and 12 minutes.

During the reaction, about 325.5 grams of ethylene are absorbed by the reaction mixture before heat transfer problems result in discontinuance of the run. Following work-up and drying, a yield of 326 grams of polymer is obtained to produce a catalyst efficiency of about 243 grams/gram, again, a considerable improvement over unaged catalyst as described in Example II which does not include an organoaluminum compound.

EXAMPLE IX

In this experiment, a diphenyl-magnesium complex containing slurry is made up by adding 12 kilograms of chlorobenzene to a 5-gallon, enclosed, jacketed vessel of the type employed in Example I, which has been previously cleaned, dried, and purged with nitrogen. To the vessel are added 156 grams of clean magnesium turnings to initiate the reaction which is controlled at 130° C., the reflux temperature of the chlorobenzene, for a period of approximately 21½ hours.

Subsequently, 2130 grams of the above mixture, 1915 milliliters, are added to an additional enclosed vessel, also maintained under a nitrogen atmosphere, containing 18.1 liters of Isopar D and 44 milliliters, 76 grams, of titanium tetrachloride. The contents are permitted to react at room temperature, 24° C., for about 1 hour before the supernatant liquid is separated from the precipitate formed, by decantation. The liquid phase is replaced with additional dry Isopar, agitated to thoroughly wash the precipitate, and the wash solution decanted. Following the addition of an amount of fresh Isopar equivalent to that decanted, three liters of the mixture are transferred to a separate vessel, maintained under a nitrogen atmosphere, and 180 gram millimoles of diisobutylaluminum hydride are added to produce the improved catalysts.

The polymerization of propylene monomer is carried out in a two-liter reactor vessel in the following manner. The reactor vessel is carefully prepared, i.e., cleaned, dried and flushed with nitrogen as in the previous examples, and one liter of dry Isopar D is added. The reactor is subsequently saturated with propylene, adjusted to a temperature of about 50° C., and 0.60 gram of catalyst, based on the total quantity of diphenylmagnesium, titanium tetrachloride and diisobutylaluminum hydride present, said ingredients constituting a molar relationship of 1.2/1.0/3.0, respectively, is added to catalyze the reaction. The reaction pressure is maintained in this example at 723 mm. Hg absolute.

The polymerization is continued for a period of 1 hour and 45 minutes before being discontinued by discharging the contents of the reactor into methanol as previously described in connection with Example I. The polymeric product is worked up and dried as in the first example to yield 5 grams of the desired product.

EXAMPLE X

In a still further example, a diphenyl-magnesium complex containing slurry is prepared as detailed in Example IX. Approximately 9.5 milliliters of the slurry are subsequently added to 95 milliliters of dry Isopar D, maintained under a nitrogen atmosphere in an enclosed catalyst reservoir, and containing one milliliter, 0.68 gram, of tetrabutyltitanate. The reaction thus begun results in a typical precipitate which is decanted and washed in the usual fashion.

The polymerization reaction is carried out in a two-liter enclosed, jacketed, stirred reactor, previously thoroughly cleaned, dried and flushed with nitrogen, to which one liter of Isopar D has been added. Following saturation of the reactor with ethylene, 0.553 gram of catalyst, based on the total weight of tetrabutyltitanate and diphenyl-magnesium present, and which has been aged for 24 hours, is added to initiate the reaction. The polymerization is continued at a temperature of 70° C. and an absolute pressure of 723 mm. Hg for about 2 hours, consuming in all, approximately 12.1 grams of ethylene.

The polymerization is thereafter terminated with methanol, and the product worked up and dried as in Example I to produce the desired polymeric product.

EXAMPLE XI

In another example, a continuous polymerization of ethylene is carried out as follows. A diphenyl-magnesium complex containing slurry is prepared in a 5-gallon reactor as described in Example IX. A three-liter charge of the catalyst is then made up by adding 2.7 liters of Isopar D to a clean, dry, nitrogen blanketed vessel. Approximately 6.6 milliliters of titanium tetrachloride are then added to the vessel, followed by 288 milliliters of the diphenyl-magnesium complex containing slurry. The resulting mixture is agitated at room temperature for approximately ½ hour before the precipitate containing mixture is decanted, reslurried, decanted, and again made up to its original volume with fresh Isopar D. The catalyst produced, which contains 8.08 grams of titanium tetrachloride and diphenyl-magnesium (combined weight) per liter, is aged for 24 hours before being employed in the following polymerization reaction.

The apparatus used consists of a 5-gallon, enclosed, glass-lined, jacketed vessel, provided with an agitator and having entry ports for the addition of make-up solvent, ethylene monomer, catalyst, and recycle solvent. The reactor is also fitted with a solvent condenser and exit ports for the removal of unreacted gases and for overflow withdrawal of product slurry. Product slurry leaving the reactor is passed to a chiller, i.e., an enclosed, glass-lined vessel, also provided with an agitator, which is maintained at room temperature. During the run, the contents of the chiller are intermittently withdrawn and fed to a filter screw, a rotating screw device enclosed by a screen wherein the solid polymer is separated from accompanying solvent. Separated solvent from the filter screw is returned periodically to the reactor, while the solid product from the screw is passed to a methanol containing vessel. The methanol mixture is processed from time to time in the usual manner to recover the polymeric product.

In carrying out the reaction, the entire apparatus is thoroughly cleaned, dried and flushed with nitrogen, following which 17 liters of molecular sieve-dried Isopar D are introduced. A steam-water mixture is passed to the reactor jacket, and the vessel's agitator is adjusted to a speed of from 700 to 800 r.p.m. After the contents of the reactor have reached a temperature of about 75° C., the nitrogen atmosphere is replaced with ethylene, added through a dip tube positioned in the interior of the reactor, and 100 milliliters of the catalyst mixture are added to initiate the reaction. Every 15 minutes following the initial addition, an additional 100 milliliters of catalyst are added throughout the run.

After approximately 4½ hours reaction time, fresh solvent is metered into the reactor at a rate slightly in excess of one liter per hour to produce the desired reactor overflow necessary for continuous product removal. The molecular weight of the product is adjusted throughout the run by the continuous addition of hydrogen which is added to the reactor together with the ethylene, the relative amounts of each, by volume, being approximately equal. The rate of addition of ethylene is adjusted to be between about 150 to 250 grams per hour.

The polymerization reaction is continued for a period of 12 hours during which time a total of about 1610 grams of polymer are produced. The catalyst efficiency throughout the run averages approximately 41, and the product produced is found to have a density of about 0.964. The bulk density of the product is determined to be about 16.6 lbs./ft.$^3$, and following deashing treatment similar to that described in Example I, the polyethylene is found to have an average ash content of approximately 0.5% on a weight percent basis.

From its melt index the molecular weight of the product is determined to have averaged about 51,000 throughout the run. Melt index, a commonly used method for approximations of molecular weight, is carried out by placing a sample of the polymer in a melt index apparatus, heating the material to a predetermined value and forcing it at a fixed pressure through an orifice. The time-weight relationship of the extrudate is compared with a calibration of the apparatus to determine the approximate molecular weight.

The entire run detailed above is characterized both by ease of operation and uniformity of product. The experiment demonstrates that the catalyst of the invention may be employed in continuous polymerizations to produce high density polyethylene products of good quality.

EXAMPLE XII

In another example, a continuous embodiment of the catalyst system is employed in which, however, diisobutylaluminum hydride is added to the catalyst, in part, to reduce the ash content of the product.

The diphenyl-magnesium complex containing slurry is perpared as described in Example IX and employed as follows. A three-liter batch of the catalyst is prepared in a clean, dry, three-liter flask, maintained under a nitrogen atmosphere, by adding 2.7 liters of dry Isopar D to the flask, followed by 6.6 milliliters of titanium tetrachloride. Approximately 288 milliliters of the diphenyl-magnesium complex is then added, and following the usual precipitate forming reaction, the mixture is decanted, reslurred, decanted again, and made up to its original volume with fresh solvent. Diisobutylaluminum hydride is then added to the mixture in an amount sufficient to adjust the molar ratios of diphenyl-magnesium/titanium tetrachloride/diisobutylaluminum hydride to values of 1.2/1.0/7.0, respectively.

The catalyst is subsequently employed in the polymerization apparatus described in Example XI as follows. The apparatus is charged with 17 liters of Isopar D, brought to temperature, 75° C., and agitation is begun and the system saturated with ethylene, all as in the previous example. Approximately 25 milliliters of catalyst are introduced to initiate the reaction, followed by 50 milliliter additions every half hour thereafter through most of the run. The polymerization is modified by introducing the ethylene monomer as an ethylene-hydrogen mixture containing approximately 15% by volume of hydrogen.

The run is continued for 12 hours and produces during that time 1851 grams of polymer having a bulk density of about 16.0 lbs./ft.$^3$, and density of approximately 0.94 gm./cc. and an ash content of only slightly above 0.03%, by weight. The catalyst efficiency through much of run varies between 40 and 50 gms./gm., while the product produced is found by melt index determinations to have a molecular weight varying between about 200,000 and 400,000.

Of particular interest is the difference in ash value between the run detailed in Example XI and the present experiment. In the former case constituting about 0.5 weight percent of the product, but only slightly over 0.03% in this example. Such a difference is not uncommon in the case of catalyst systems of the invention which contain an organoaluminum compound, and is one of the reasons such an embodiment is in many cases preferred.

EXAMPLE XIII

In a still further experiment, a diphenyl-magnesium complex containing slurry is made up as in Example IX. Following its preparation, unlike the procedures employed in the previous examples, the slurry is permitted to settle, and the clear supernatant liquid is separated therefrom. The catalyst is made up by adding 2.6 liters of dry Isopar D to a clean, dry, three-liter flask maintained under a nitrogen atmosphere, followed by 6.6 milliliters of titanium tetrachloride, and thereafter 410 milliliters of the supernatant liquid obtained from the diphenyl-magnesium slurry. The mixture is permitted to react at room temperature, 23° C., to produce a precipitate containing slurry which is decanted, reslurried, decanted and made up to its original volume in the ordinary manner.

Following an aging period of 75 hours, the catalyst is employed in a polymerization reaction as follows.

A two-liter reactor vessel of the type described in connection with Example V, cleaned, dried and purged with nitrogen, is charged with one liter of molecular sieve-dried Isopar D. The reactor system is purged with ethylene, and 0.2 gram of catalyst, based on the total weight of diphenyl-magnesium and titanium tetrachloride present, is charged to the reactor to initiate the reaction. The polymerization is continued at a temperature of 70° C. and a pressure of 730 mm. Hg absolute for a period of 2 hours before being terminated and worked up in the manner of the previous examples.

The product resulting consists of 135 grams of polymer having a bulk density of 6.7 lbs./ft.$^3$ and a density of 0.945 gm./cc. The catalyst efficiency is calculated from a total ethylene absorption of 156 grams to have been 675 gms./gm.

It is observed in comparing the experiment of this example with that of Example II, in which the catalyst is aged for 69.5 hours, that the efficiency of the latter experiment, 925 gms./gm., is much greater than that obtained here. Equally important, the bulk density of the Example II experiment is 17.3 lbs./ft.$^3$ while that of the present experiment is only 6.7. In view of the results, it is apparent that inclusion of all components of the diphenyl-magnesium complex containing slurry are essential if the improved products obtainable through the use of the present invention are to be achieved.

EXAMPLE XIV

In an additional example, modification of an ethylene polymerization is achieved through the addition of boron trifluoride in the following manner.

A diphenyl-magnesium complex containing slurry is prepared in the manner of Example IX and employed in the synthesis of the polymerization catalyst as follows. To a catalyst reservoir previously cleaned, dried, and purged with nitrogen are added 90 milliliters of hydrogenerated propylene trimer and subsequently, 0.22 milliliter of titanium tetrachloride. Approximately 9.5 milliliters of the diphenyl-magnesium slurry are added to produce the typical precipitate forming reaction which is carried on at room temperature. Following a reaction period of ½ hour, the catalyst is decanted, reslurried, decanted and made up to its initial volume with fresh solvent as in the previous examples.

The polymerization is performed in a two-liter reactor of the type described in the previous example to which one liter of hydrogenated propylene trimer has been added. The reactor is presaturated with ethylene containing 5% by volume boron trifluoride gas, and approximately 1.47 grams of catalyst, aged for about 1½ hours, are added to the system to begin the polymerization reaction. The reaction is continued for two hours before being discontinued and worked up in the ordinary way to yield 6 grams of polymer having a density of 0.950 gm./cc. and a molecular weight of approximately 90,000.

What is claimed is:

1. A process for producing an improved polymerization catalyst comprising reacting, as the sole complex-forming reactants; magnesium, and amount of an organohalide having the formula RX, where X is a halogen atom and R, which may be halogen substituted, is selected from the group consisting of alkyl, aryl, and arylalkyl radicals, in excess of that required to react with said magnesium thereby to form a mixture consisting of both a solid and a liquid phase and containing an organo-magnesium complex in both of said phases, thereafter admixing at least one of said phases with the salt of a heavy metal selected from the group consisting of titanium, vanadium, cobalt and zirconium to form an active catalyst, the molar ratio of said complex to said heavy metal salt being greater than 0.77.

2. A process for polymerizing alpha-monoolefins comprising contacting an alpha-monoolefin with a catalyst produced in accordance with claim 1.

3. A process for producing an improved polymerization catalyst comprising reacting, as the sole complex-forming reactants; magnesium and an amount of an organohalide having the formula RX, where X is a halogen atom and R, which may be halogen substituted, is selected from the group consisting of alkyl, aryl, and arylalkyl radicals, in excess of that required to react with said magnesium, thereby to form a mixture consisting of both a solid and a liquid phase and containing a complex an organo magnesium complex in both of said phases reagent, thereafter adding said complex to a titanium compound selected from the group consisting of titanium halides, and titanium alcoholates to form an active catalyst, the molar ration of said complex to said compound being greater than 0.77.

4. A process for producing an improved polymerization catalyst comprising reacting, as the sole complex-forming reactants; magnesium and an amount of a phenylhalide in excess of that required to react with said magnesium thereby to form a mixture consisting of both a solid and a liquid phase and containing an organo-magnesium complex in both of said phases, adding at least one of said phases to a titanium salt, the molar ratio of said complex to said salt being greater than 0.77, and then substantially replacing the liquid phase of the resulting mixture with a liquid in which the solid phase of said mixture is substantially insoluble, to form an active catalyst.

5. A process for producing an improved polymerization catalyst comprising reacting, as the sole complex-forming reactants; magnesium and an amount of an organohalide having the formula RX, where X is a halogen atom and R, which may be halogen substituted, is selected from the group consisting of alkyl, aryl, and arylalkyl radicals, in excess of that required to react with said magnesium thereby to form a mixture consisting of both a solid and a liquid phase containing an organo-magnesium complex in both of said phases, reacting at least one of said phases with a titanium compound selected from the group consisting of titanium trihalides, titanium tetrahalides and titanium alcoholates with the molar ratio of said complex to said titanium compound being greater than 0.77 and subsequently combining the resulting mixture with an organoaluminum compound having the formula $R'_{3-n}AlR''_n$, where R′ represents hydrocarbon radicals which may be the same or different, R″ reprsents a hydrogen or halogen atom, and $n$ is 0 to 2, to form an active catalyst.

6. A process for polymerizing alpha-monoolefins comprising contacting an alpha-monoolefin with a catalyst prepared in accordance with claim 5, in the presence of an organic solvent, and at a temperature of from about 0° C. to about 100° C.

7. A process for producing an improved polymerization catalyst comprising reacting, as the sole complex-forming reactants; magnesium and an amount of an organohalide having the formula RX, where X is a halogen atom and R, which may be halogen substituted, is selected from the group consisting of alkyl, aryl, and arylalkyl radicals, in excess of that required to react with said magnesium thereby to form a mixture consisting of both a solid and a liquid phase and containing an organo-magnesium complex in both of said phases, reacting at least one of said phases with a titanium salt selected from the group consisting of titanium trihalides, titanium tetrahalides and titanium alcoholates, subsequently replacing the liquid phase of the combination so produced with a liquid medium in which the solid phase of said combination is substantially insoluble, and then combining the resulting mixture with an organoaluminum compound of the formula $R'_{3-n}AlR''_n$ where R′ represents hydrocarbon radicals, which may be the same or different, R″ represents a hydrogen or halogen atom, and $n$ is 0 to 2, to form an active catalyst.

8. A process for polymerizing alpha-monoolefins comprising contacting an alpha-monoolefin with a catalyst produced according to claim 7, in the presence of an organic solvent and a molecular weight reducing substance, at a temperature from about 60° C. to about 80° C., and thereafter discontinuing the polymerization and separating the polymer produced.

9. A process for producing an improved polymerization catalyst comprising reacting, as the sole complex-forming reactants; magnesium and an amount of a phenylhalide compound in excess of that required to react with said magnesium thereby to form a mixture consisting of both a solid and a liquid phase and containing a phenyl-magnesium complex in both of said phases, adding and reacting at least part of said complex to a mixture of an organic solvent and a titanium salt selected from the group consisting of titanium halides and titanium alcoholates, then substantially replacing the liquid phase of the combination so produced with a liquid medium in which the solid phase of said combination is substantially insoluble, and thereafter aging the resulting mixture until the desired catalyst activity has been achieved.

10. A process for producing an improved polymerization catalyst comprising reacting, as the sole complex-forming reactants; magnesium and an amount of a phenylhalide compound in excess of that required to react with said magnesium thereby to form a mixture consisting of both a solid and a liquid phase and containing a phenylmagnesium complex in both of said phases, adding at least one of said phases to a mixture of an organic solvent and a titanium salt selected from the group consisting of titanium trihalides, titanium tetrahalides and titanium alcoholates, substantially replacing the liquid phase of the combination so produced with a liquid medium in which the solid phase of said combination is substantially insoluble, and subsequent to the reaction of the complex with the titanium salt combining the resulting mixture with an organoaluminum compound having the formula $R'_{3-n}AlR''_n$ where R′ represents hydrocarbon radicals which may be the same or different, R″ represents a hydrogen or halogen atom, and $n$ is 0 to 2, to form an active catalyst.

11. A process for producing an improved polymerization catalyst comprising heating, as the sole complex-forming reactants, until the resulting reaction is substantially complete; magnesium and an amount of a phenylhalide compound in excess of that required to react with said magnesium thereby to form a mixture consisting of both a solid and a liquid phase and containing a phenyl-magnesium complex in both of said phases, thereafter adding at least one of said phases to a titanium halide compound in an organic solvent, the molar ratio of said complex to said titanium halide being greater than 0.77, subsequently substantially replacing the liquid phase of the combination so produced with a liquid medium in which the solid phase of said combination is substantially insoluble, and aging the catalyst until the desired catalyst activity has been achieved.

12. A process for polymerizing ethylene comprising contacting ethylene with a catalyst prepared according to claim 11, in the presence of a molecular weight reducing substance and a liquid medium having substantially no solubility for the solid phase of said catalyst, sufficient catalyst being employed so that the phenylmagnesium complex together with the titanium halide is present in the amount of at least about 0.1 gram per liter of polymerization reaction mixture, the polymerization being carried out at a temperature from about 60° C. to about 80° C. and thereafter discontinuing the polymerization and separating the polymer produced.

13. A process according to claim 12 in which the molecular weight reducing substance is hydrogen.

14. A process according to claim 12 in which a mixture of alpha-olefins including both ethylene and propylene is polymerized.

15. A process according to claim 12 in which the molecular weight reducing substance is controlled at the level at which a polymer having a density of at least about 0.96 is produced.

16. The process of claim 12 further characterized in that it includes the steps of further removing residues by the addition of an organoaluminum compound of the formula $R'_{3-n}AlR''_n$ where R′ represents hydrocarbon radicals which may be the same or different, R″ represents a hydrogen or halogen atom, and *n* is 0 to 2, to a polymer formed from alpha-monoolefins by means of a polymerization reaction and containing catalyst residue impurities, said addition taking place prior to inactivation of the polymerization reaction, and thereafter subjecting said polymer to a liquid extraction purification treatment whereby the polymeric product obtained is characterized by having a relatively low level of said impurities compared to the level contained by such polymers prepared in the absence of such addition.

17. A process for producing an improved polymerization catalyst comprising heating, as the sole complex-forming reactants, until the resulting reaction is substantially complete; magnesium and an amount of a phenylhalide compound in excess of that required to react with said magnesium thereby to form a mixture consisting of both a solid and a liquid phase and containing a complex containing diphenyl magnesium in both of said phases, adding at least one of said phases to a mixture of titanium halide in an organic solvent, the diphenylmagnesium constituent of said complex containing mixture and said titanium halide being present in amounts such as to constitute a ratio of the former to the latter of at least about 0.77, after the reaction of the diphenylmagnesium with the titanium halide, substantially replacing the liquid phase of the combination so produced with a liquid medium in which the solid phase of said combination is substantially insoluble, and subsequently combining said combination with an organoaluminum compound of the formula $R'_{3-n}AlR''_n$ where R′ represents hydrocarbon radicals which may be the same or different, R″ represents a hydrogen or halogen atom, and *n* is 0 to 2, in relative amounts such that the ratio of said organoaluminum compound to said titanium halide is at least about 1.5, to form an active catalyst.

18. A process for polymerizing ethylene comprising contacting ethylene with a catalyst produced in accordance with claim 3.

19. A process for polymerizing propylene comprising contacting propylene with a catalyst produced in accordance with claim 3.

References Cited

UNITED STATES PATENTS

| | | | |
|---|---|---|---|
| 3,058,963 | 10/1962 | Vandenberg | 260—94.9 |
| 3,051,690 | 8/1962 | Vandenberg | 260—94.9 |
| 3,030,350 | 4/1962 | De Jang | 260—94.9 |
| 3,143,577 | 8/1964 | Bryce-Smith | 260—665 |
| 3,264,360 | 8/1966 | Nudenberg et al. | 260—665 |
| 3,247,173 | 4/1966 | Shearer | 260—88.2 |
| 2,954,367 | 9/1960 | Vandenberg | 260—94.9 |

OTHER REFERENCES

Sittig: Polyolefin Resin Processes, Gulf Publishing Company, Houston, Tex. (page 187 relied on).

JOSEPH L. SCHOFER, *Primary Examiner.*

M. B. KURTZMAN, *Assistant Examiner.*